Feb. 6, 1923. Re. 15,536

E. INGHAM.

METHOD AND APPARATUS FOR WEAVING TEXTILE FABRICS.

ORIGINAL FILED JAN. 20, 1920. 4 SHEETS-SHEET 2

Inventor

Emanuel Ingham,

By J. Hanson Boyden,

Attorney.

Feb. 6, 1923. Re. 15,536
E. INGHAM.
METHOD AND APPARATUS FOR WEAVING TEXTILE FABRICS.
ORIGINAL FILED JAN. 20, 1920. 4 SHEETS-SHEET 3
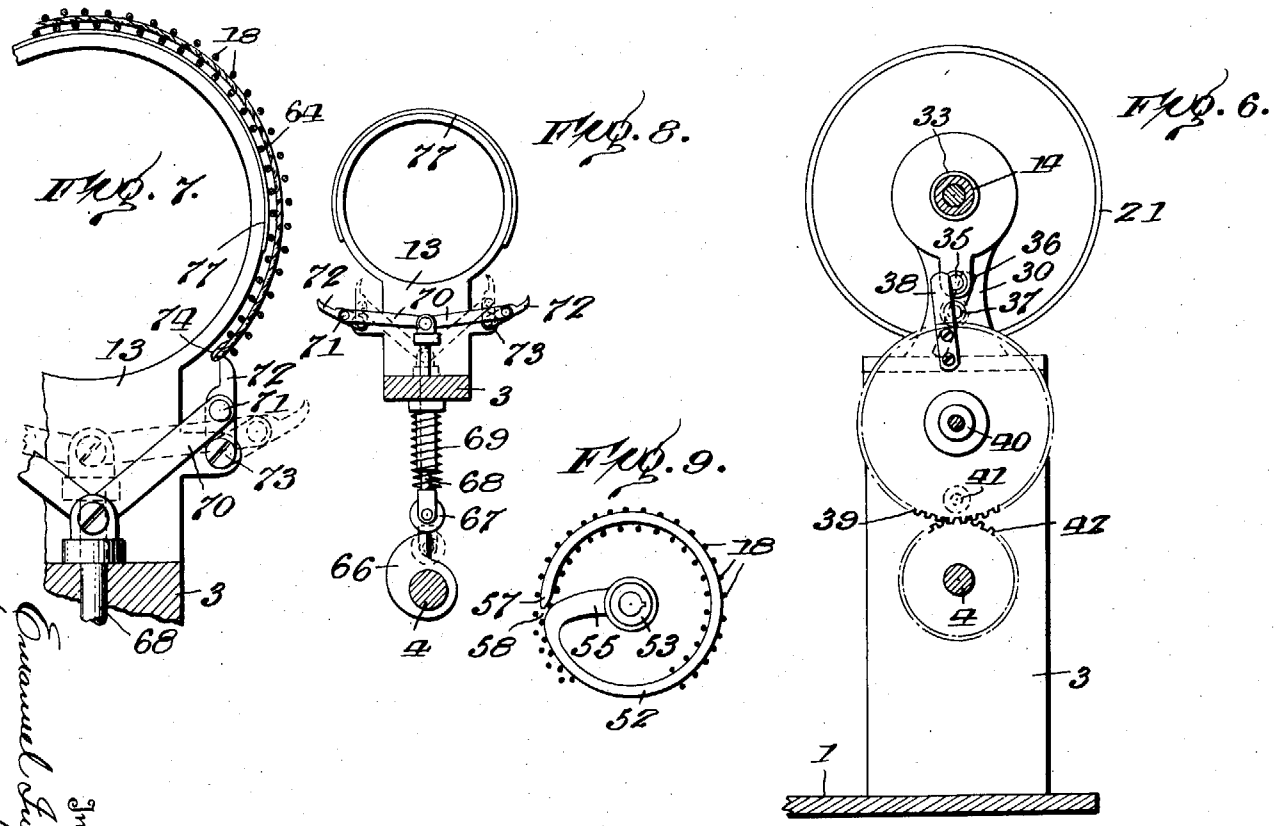
Inventor
Emanuel Ingham,
By J. Hanson Boyden,
Attorney.

E. INGHAM.

METHOD AND APPARATUS FOR WEAVING TEXTILE FABRICS.

ORIGINAL FILED JAN. 20, 1920. 4 SHEETS-SHEET 4

Inventor

Emanuel Ingham,

By J. Hanson Boyden,

Attorney

Reissued Feb. 6, 1923.

Re. 15,536

UNITED STATES PATENT OFFICE.

EMANUEL INGHAM, OF WASHINGTON, DISTRICT OF COLUMBIA.

METHOD AND APPARATUS FOR WEAVING TEXTILE FABRICS.

Original No. 1,328,794, dated January 20, 1920, Serial No. 197,128, filed October 17, 1917. Application for reissue filed December 19, 1921. Serial No. 523,582.

*To all whom it may concern:*

Be it known that I, EMANUEL INGHAM, a subject of the King of Great Britain, and a resident of Washington, the District of Columbia, have invented certain new and useful Improvements in Methods and Apparatus for Weaving Textile Fabrics, of which the following is a specification.

This invention relates to weaving, and more particularly to a method and apparatus for weaving textile fabrics, especially curved fabrics.

In its broader aspects, the improved method of weaving comprehended in the present invention is applicable to the production of fabrics of any shape or material, but more specifically the invention contemplates the production of fabrics C-shaped in cross-section, suitable for use in the manufacture of pneumatic tire casings. Such fabric can be employed either as a textile foundation, embedded in rubber, to form the casing itself, or as a lining, or as a protective or anti-slipping covering for tires.

Among the objects of the invention, are, to provide novel means for weaving without the use of a shuttle, such means comprising instead a needle of special design for laying the weft, whereby the simplicity and speed of the loom is greatly increased, especially for coarse work; and to provide means for producing indefinite lengths of woven fabric curved in cross-section and also curved longitudinally, such fabric, as it comes from the loom, conforming to the shape of a tire, thus obviating the necessity for pressing or molding the fabric, as has been the usual custom heretofore. So far as I am aware I am the first to propose the weaving of a fabric of double curvature, in indefinite lengths, as described.

In order that the various features of the invention may be readily understood, reference is had to the accompanying drawings, forming part of this specification, and in which, Figure 1 is a side elevation of a weaving machine or loom constructed in accordance with the invention;

Figure 2 is a fragmentary vertical section through the needle and associated parts;

Figure 6 is a vertical section through the machine substantially on the line 6—6 of Figure 1, looking in the direction of the arrows;

Figure 7 is an enlarged fragmentary rear elevation of the warp supporting frame and weft engaging hooks or detents, the fabric being shown in section;

Figure 8 is a similar view on a smaller scale showing the operating mechanism for the hooks;

Figure 9 is a schematic view on a small scale illustrating the relation of the needle to the warp threads;

Heretofore, so far as I am aware, in all the various attempts which have been made to produce woven textile fabrics, circular or C-shaped in cross-section, a shuttle of one form or another has always been employed. The problem of replenishing the shuttle with thread has always been and still is a very vexing one and numerous inventions have been devised to facilitate this operation. The inherent defects of a shuttle in this respect become particularly marked when coarse or heavy thread is used for the weft, for in such cases it is possible to wind but a comparatively small amount of thread on the bobbin carried by the shuttle.

Figures 1, 1A:
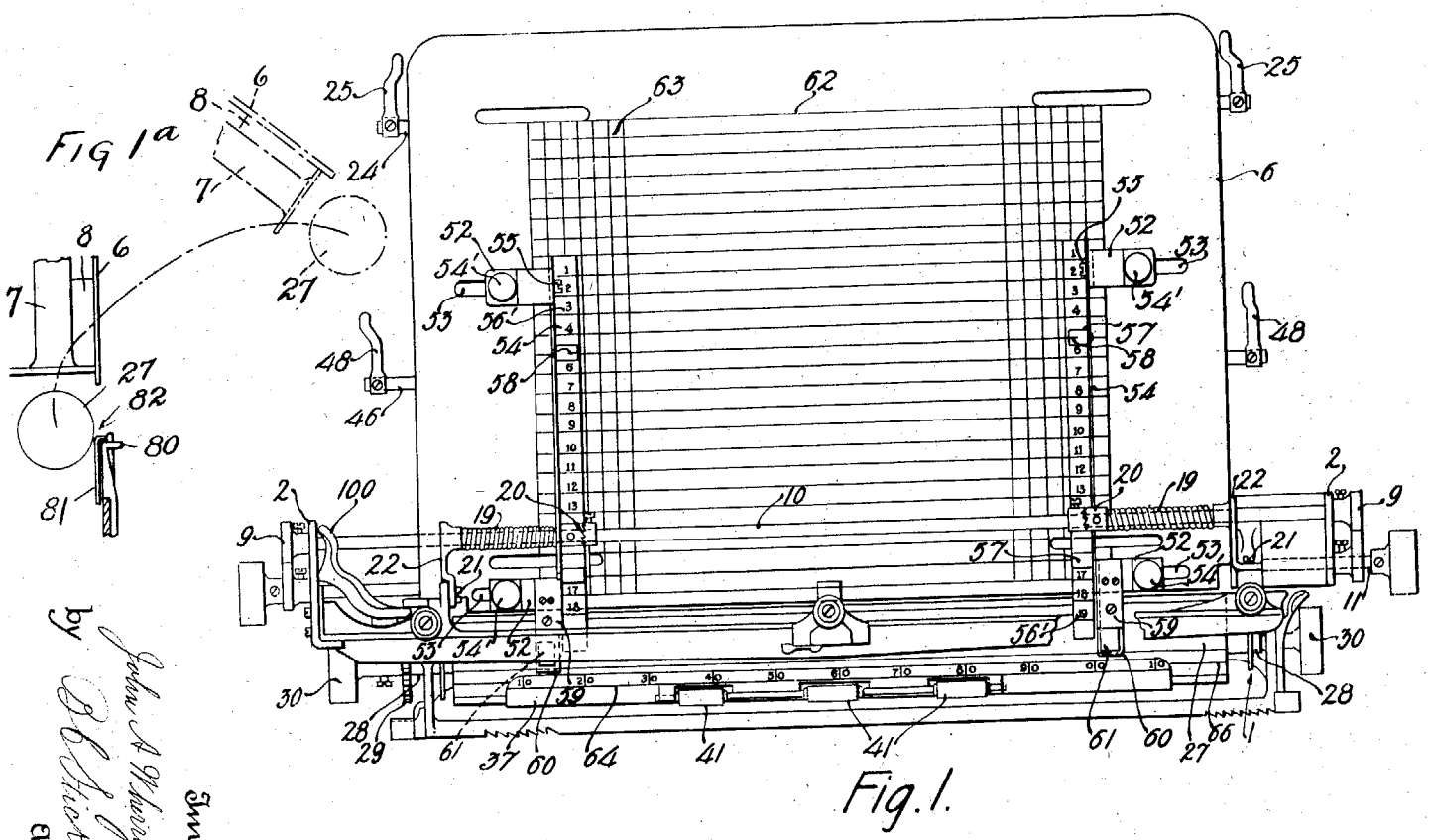

Probably the most striking departure from former practice which characterizes the present invention is that in producing such fabrics I propose to eliminate the shuttle entirely and to lay the weft thread in the shed of the warp by means of a tion and then in the other, the extent of oscillation of the gear 31 being such as to turn the pinions 28 and the attached crank arms 26 through 180°. As a result of such rotation of the pinions and arms 26, it will be seen that the front series of segmental blocks 24 is first moved radially outward, while the blocks of the rear series are moved radially inward, as shown in the drawing, and then, at the end of the next oscillation, the front series of blocks are moved radially inward and the rear series moved radially outward. The warp threads being led alternately through heddle wires supported by the front and rear series of blocks respectively, it is obvious that the alternate radial movement of the blocks and heddle rods, as described, will result in the formation of a curved or cylindrical shed. This is indicated in Figures 1 and 2.

The wheel 39 meshes with and is driven by a pinion 42 secured to the shaft 4.

The sleeve 14 carries a pin 43 which is engaged by the slotted end 44 of a lever 45 pivoted at 46 to the frame member 2 and carrying at its other end a roller 47. This roller 47 is arranged to engage the edge of a cam wheel 48 rigidly secured to the shaft 4 and provided with a pair of bevel ended notches 49. As the wheel revolves the roller 47 is caused to drop into and ride out of these notches, being urged toward the cam wheel by means of a bow spring 50 secured to the stud 40 by means of a bolt 51. The free end of the spring 50 bears against the lower end of the lever 45, as clearly shown in Figure 1. It will be therefore seen that each time the roller 47 drops into a notch 49 the sleeve 14 will be shifted quickly to the left, thus bringing the spider 15 sharply against the rear side of the needle 52 now to be described.

Figure 5:
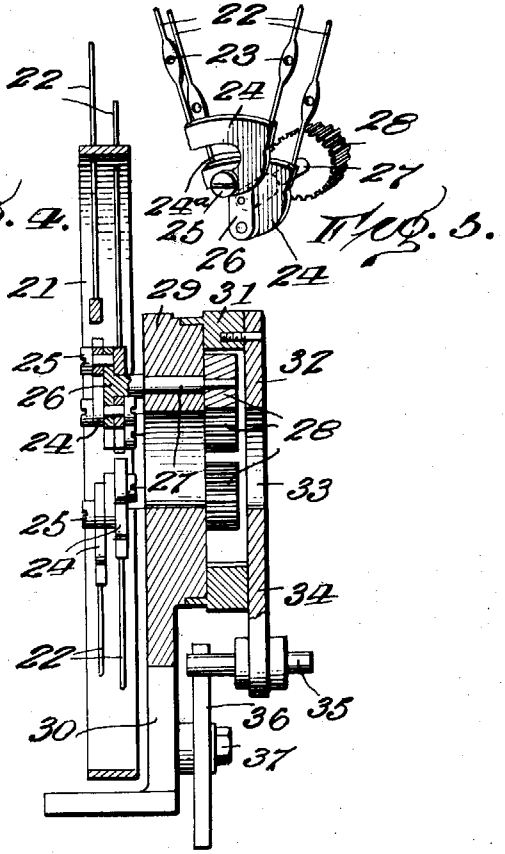
Figure 5 is a detail perspective view of one section of the heddle and the operating means therefor.
Figure 4:
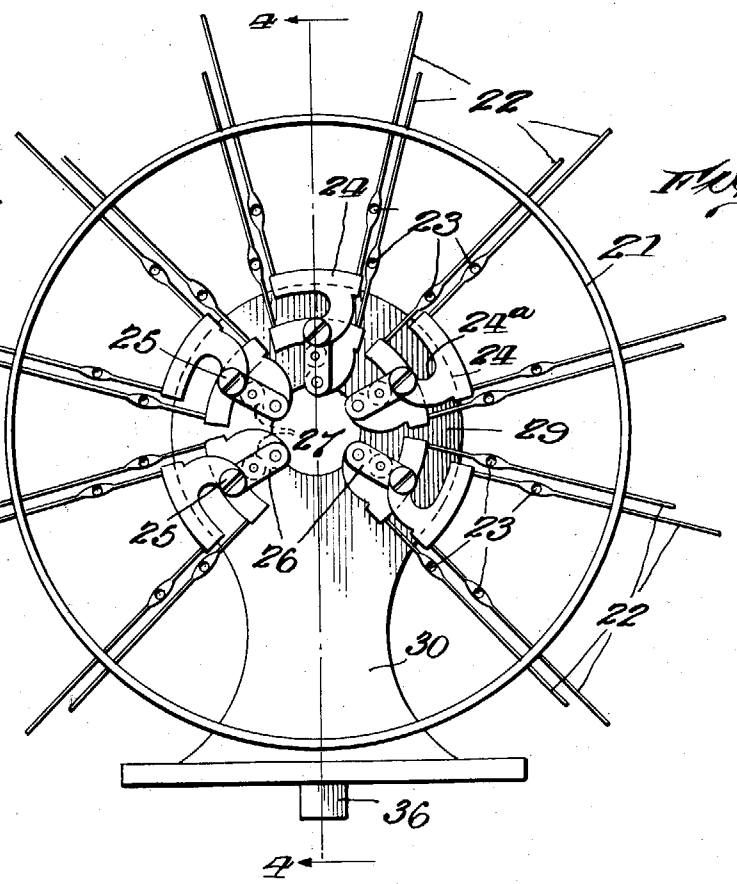
Figure 4 is a vertical section on the line 4—4 of Figure 3.
Figure 3:
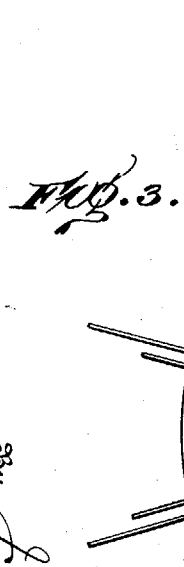
Figure 3 is a front elevation of an enlarged scale of the improved heddle which I employ.
Figure 10:
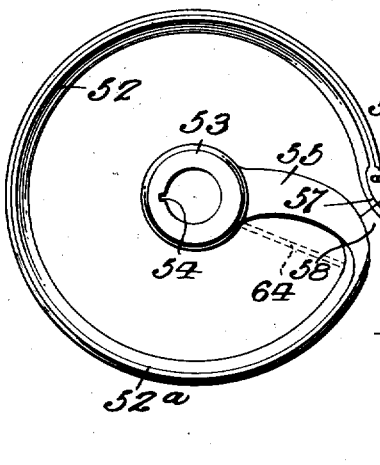
Figures 10 and 11 are front and rear elevations respectively of the needle, on an enlarged scale.
Figure 11:
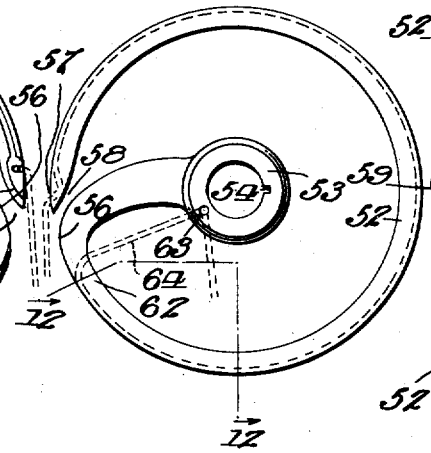
Figure 12:
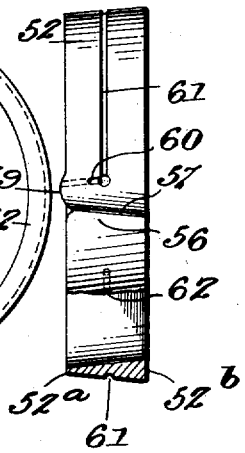
Figure 12 is an edge view of the needle partly in section on the line 12—12 of Figure 11.
Figure 13:
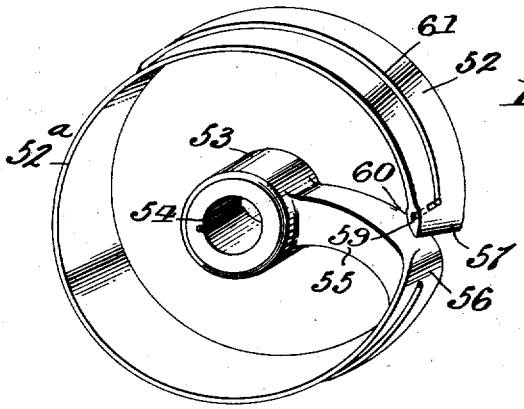
Figure 13 is a perspective view of the needle.

In order to avoid the use of a shuttle, as mentioned in the first part of this specification, I employ the novel needle device shown in detail in Figures 9 to 13. Although such needle may be very slightly eccentric or spiral, it is shown in the drawings as circular and mounted upon a substantially true center. The needle, which is designated in its entirety by the reference character 52, consists of a flat annular member secured to a hub 53 and supported by means of a single spoke or arm 55 which is attached to the needle body at its heel 56. The hub 53 is provided with an axial keyway 54, by means of which it is suitably keyed to the shaft 11 but is free to move longitudinally thereon. The needle has a free end or point 57 which is preferably wedge shaped or sharpened, as shown, so as to facilitate its entering the shed of the warp, and between such point and the rounded heel 56 is a gap or slot 58 through which the warp threads pass. As shown in Figure 12, the body of the needle is itself preferably wedge-shaped in cross-section, the front edge $52^a$ being relatively thin and the rear edge $52^b$ being thicker. It will be understood that the width of the needle may be made as great as desired, this being determined by the strength and rigidity which it is necessary for the needle to have. At the forward edge adjacent the point 57, the needle is provided with a slight extension or projection 59 through which extends the thread delivery eye 60. This eye extends transversely of the needle to a point near its center where is merges into a groove and joins a circumferential groove 61 extending around the periphery of the needle body. Adjacent the heel an opening 62 extends from the groove 61 through the body of the needle to the inside thereof and the hub 53 is also provided with a thread guiding eye 63. The weft thread 64 which is supplied from a fixed reel 65 located at any desired point, is led through the eye 63, through the opening 62, and thence follows the groove 61 around the circumference of the needle to the eye 60 and is delivered from such eye at approximately the most forward point of the projection 59.

As clearly shown in Figure 2, the needle 52 is of such size as to just snugly fit over the circular frame 13 around which the warp threads are supported and the needle is adapted to enter the shed of the warp, as illustrated in this figure and in Figure 9.

In order to properly catch and hold the weft threads at the edges of the fabric I provide the mechanism illustrated in detail in Figures 7 and 8. Referring to these figures, 66 designates a cam secured to the shaft 4 at its forward end and on this cam rides a roller 67 carried at the lower end of a plunger 68 around which is disposed a helical spring 69. The upper end of the plunger 68 is pivotally connected to a pair of toggle levers 70, each of which is pivoted at its free end at 71 to a hook or detent 72 pivoted at 73 to the frame 13. These hooks or detents 72 are adapted to engage the loops 74 formed in the weft threads at the edges of the fabric, as shown in Figure 7 and when moved to the position shown in dotted lines in Figure 7, to release or cast off such loops. The cam 66 is so shaped that the movement of the detents 72 relative to the needle will be properly timed.

A spring 75 is interposed between the hub 53 of the needle and the bearing 12 (see Figure 2) so as to return the needle to its normal position after it has been forced forward by the spider 15.

In order to sustain the fabric and hold it in shape as it leaves the needle and curved frame 13, I provide an arc-shaped shield or support 77, preferably formed of thin sheet metal and secured at its rear end to the frame 13, said frame having formed integral therewith a forwardly extending bracket 76 adapted to support such shield. Within the shield 77 and adapted to move freely relative to the same is disposed a form 78 similar in shape to the tire for which the fabric is intended. This form 78 is supported on one or more spokes 79 secured to a suitable hub and loosely journaled on a shaft 80. The spokes 79 also carry an arc-shaped segment 81 on which lies a strap 82 carrying at its free end a weight 83 which serves to exert the proper tension on the fabric and warp threads, as will be obvious. Also mounted on the shaft 80 is a ratchet wheel 89 and a circular rack 91, rigidly united. On the shaft 4 is mounted a cam 85 adapted to engage a lever 86 pivoted at 87 to the frame member 3 and carrying at its free end a pivoted pawl 88 adapted to engage the ratchet wheel 89. A fixed pivoted pawl 90 also engages such ratchet wheel to prevent the backward rotation thereof.

A latch 92 carried by one of the spokes 79 is arranged to engage the rack 91 and such latch may be operated by means of a handle 94 and link 93, said link being surrounded by a helical spring 95 which serves to keep the latch in engagement. It will be understood that as the shaft 4 rotates the pawl 88 is reciprocated, thus giving a forward step-by-step movement to the form 78, such movement being in the direction in which the weight 83 tends to urge the form. After the form has moved to the desired extent it may be set back toward the position shown in Figure 1 by means of the latch 92. Thus while the ratchet wheel 89 and rack 91 revolve continuously in one direction, the form 78 may be released from and locked to such wheels as desired, in order to secure a proper take-up of the material. The form 78 is provided near its inner side with a series of pins or hooks 84 adapted to engage the loops formed in the edge of the fabric and it will be understood that as the form moves to the left and downwardly, as seen in Figure 1, the fabric slips along over the surface of the shield 77. The chief function of the shield is to support the fabric and bridge the gap between the circular frame 13 and the end of the form 78 when the latter is in its lower positions.

The shield or support 77, taken with the frame 13, to which it is rigidly attached, together constitute a fixed, elongated structure curved both transversely and longitudinally, around one end of which the weft thread is laid, and along which the finished fabric is fed or drawn by the above described mechanism, as fast as it is produced.

A brief description of the operation of the machine as a whole will now be given. As the shaft 4 revolves, an alternating rotary motion is given to the shaft 11 and the needle 52 which is keyed thereto. The warp threads having been led through the heddle mechanism above described are secured to the form 78 by any suitable means, such threads preferably passing through an opening in a die plate 20 which surrounds the circular frame 13 and serves to confine and guide said warp threads. As the needle oscillates, it will enter the shed, as illustrated in Figures 2 and 9, part of the warp remaining on the outside of the needle and part passing to the inside of the needle. The weft thread is thus laid by the needle in the shed of the warp, such thread being delivered from the eye 60 at the point 59. At the end of each complete oscillation of the needle the weft thread is engaged by the hook or detent 72 and on the return stroke a loop of weft thread is formed around such detent, as shown in Figure 7. It is obvious that it is necessary for the needle to make a complete oscillation in one direction and return to its starting point so as to be completely withdrawn from the shed before the shed changes, and therefore it is apparent that two weft threads will be laid side by side in each shed of the warp. It will also be clear that at one edge of the fabric the weft is looped around the warp thread, thus forming a true selvage, while at the other edge a series of loops is formed, as shown in Figure 7. It will also be understood that while both of the detents 72 move together, only one is operative at any one time, the weft threads being caught first by the hook on one side and then by the hook on the other side, as the needle oscillates back and forth. The fact that the warp threads 18 are held under tension by the mechanism above described, enables such threads to strip the loops 74 from the detents, as such detents are moved outwardly.

After each oscillation of the needle and therefore after the laying of every pair of weft threads, the spider 15, through the mechanism above described, gives the needle a sharp blow, thus driving it to the left and beating up the weft tightly into the fell of the fabric. After each such movement the spring 75 returns the needle to normal position.

It will be observed that the frame 13 and needle 52 are disposed at the same distance from the axis 80 as is the form 78, and lie in a plane substantially radial to such axis, and perpendicular to the median line of said form. The weft threads are therefore laid in true radial planes, and as they extend entirely across or around the fabric from one edge to the other, they will necessarily be crowded more closely together at the inside or heels of the tire fabric than at the tread portion thereof. This results in a strong tendency for the woven fabric to retain its curved shape after it leaves the form 78 and when my improved fabric is woven in indefinite lengths, it will curl itself into a spiral or helix. When using the fabric in tire manufacture a suitable length will be cut off and the ends spliced together to form a complete annulus.

What I claim is:

1. In a loom, the combination with a curved frame, and means for supporting warp threads therearound, of a rigid annular needle constructed to lay weft threads around such frame across the warp and disposed in a plane extending transversely of such warp.

2. In a loom, the combination with means for supporting warp threads so as to conform to the arc of a circle, of a similarly shaped rigid annular needle mounted with its center on the axis of such circular warp, and adapted to lay weft thread across the same.

3. In a loom, the combination with means for supporting warp threads and for forming a substantially cylindrical shed, of an annular oscillatory needle adapted to enter such cylindrical shed and lay weft thread therein, said needle being mounted with its center on the axis of said cylindrical shed.

4. In a loom, the combination with means for supporting warp threads so as to define a curved surface, of means for forming a shed and an annular oscillatory needle adapted to lay weft thread in such shed, said needle lying in a plane extending transversely of the warp threads and having a gap through which such threads pass.

5. In a loom, the combination with means for supporting warp threads so as to form a curved surface, of means for producing a shed in such warp, and an annular needle lying in a plane transverse to said warp threads adapted to enter said shed and lay weft thread therein, said needle having a gap through which the warp threads pass, and a point having a weft thread delivery eye adjacent said gap.

6. In a loom, the combination with means for supporting warp threads so as to form a curved surface, of means for producing a shed in such warp, and an annular needle having a point adapted to enter said shed and carry the weft thread therethrough, said needle being disposed in a plane transverse to said warp threads and having a gap through which such warp threads pass.

7. In a loom, the combination with means for supporting warp threads so as to form a curved surface, of means for producing a shed in such warp, and an annular needle adapted to enter said shed and lay weft thread therein, said needle having a gap, and a point adjacent such gap, said point having an eye, and the body of the needle having a circumferential groove around which the weft thread passes on its way to said eye.

8. In a loom, the combination with means for supporting warp threads and forming a shed, of a fixed reel, and a needle adapted to lay weft thread from said reel in such shed, said needle being flat and extended in a direction parallel with the warp threads, and relatively thin in a direction at right angles thereto, so as to easily enter the shed, and having a thread delivery eye opening out through its edge.

9. In a loom, the combination with means for supporting warp threads and forming a shed, of a fixed reel, a needle adapted to enter the shed, means for moving said needle transversely of the warp so as to cause it to lay weft thread from said reel in such shed, and means for moving the needle longitudinally of the warp so as to drive the weft threads together.

10. In a loom, the combination of means for supporting warp threads around a circular frame, and forming a shed therein, of a fixed reel, an annular needle provided with a point adapted to enter the shed and having an eye through which weft thread is delivered from said reel, means for oscillating said needle so as to cause it to lay weft threads across the warp in such shed, and means for shifting said needle longitudinally of the warp so as to cause it to beat up the weft threads into position.

11. In a loom, the combination with means for supporting warp threads and forming a shed, of a fixed reel, a needle adapted to enter the shed, means for moving said needle in a fixed plane transversely of the warp so as to cause it to lay weft thread from said reel in such shed, means for shifting the needle longitudinally of the warp so as to beat up the weft thread into the fell of the fabric, and automatic means for returning the needle to normal position after each such beating stroke.

12. In a loom for weaving fabrics C-shaped in cross-section, the combination with means for supporting warp threads to form a curved surface, of means for forming a shed, a pair of movable detents disposed one adjacent each edge of such warp, a curved oscillatory needle for laying weft thread back and forth through the shed and looping it around such detents, and means for moving said detents to withdraw them from the loops thus formed.

13. In a loom for weaving fabrics C-shaped in cross-section, the combination with means for supporting warp threads to define a curved surface, of means for forming a shed, a movable detent disposed adjacent one side of such warp, a curved oscillatory needle for laying weft thread back and forth through the shed and looping it around said detent, such weft thread forming a true selvage edge at the other side of the warp, and means for automatically moving said detent to withdraw it from the successive loops thus formed.

14. In a loom for weaving circular fabrics, the combination with means for supporting warp threads to define a curved surface, of means for forming a shed, a movable detent adjacent such warp, a curved oscillatory needle for laying weft thread back and forth through the shed and looping it around said detent, and means for automatically moving said detent to cause it to cast off the loops thus formed.

15. In a loom for weaving curved fabrics, a heddle comprising a series of radially disposed rods having thread receiving eyes intermediate their ends arranged around the arc of a circle, the outer ends of said rods being free, a guide frame through which such free ends of the rods loosely slide, and means attached to the inner ends of said rods for shifting them simultaneously radially inward or outward.

16. In a loom for weaving curved fabrics, the combination with a curved frame around which the warp threads are supported, of a similarly curved oscillatory needle adapted to lay weft threads in a fixed plane around said frame and across the warp, and a centrally pivoted segmental annular form having one end in position to receive the woven fabric as it comes from such frame, said needle and frame lying in a plane substantially radial to the pivotal axis of said form.

17. In a loom for weaving curved fabrics, the combination with a curved frame around which the warp threads are supported, of means for laying weft threads in a fixed plane around said frame and across the warp, and a segmental annular form having one end in position to receive the woven fabric as it comes from such frame, said frame lying in a plane substantially radial to the center of curvature of said form.

18. In a loom for weaving curved fabrics, the combination with a curved frame around which the fabric is woven, of a segmental annular form having one end in position to receive the fabric as it comes from such frame, said form being pivotally supported on a central axis.

19. In a loom for weaving curved fabrics, the combination with a curved frame around which the fabric is woven, of a segmental annular form having one end in position to receive the fabric as it comes from such frame, said form being pivotally supported on a central axis, and means for moving such form about its axis in a direction away from said circular frame.

20. In a loom for weaving curved fabrics, the combination with a curved frame around which the fabric is woven, of a segmental annular form having one end in position to receive the fabric as it comes from such frame, said form having a series of pins adapted to engage the edge of the fabric, and being pivotally supported on a central axis.

21. In a loom for weaving curved fabrics, the combination with a curved frame around which the fabric is woven, of a segmental annular pivoted form having one end in position to receive the fabric as it comes from said frame, and a thin, fixed, curved shield bridging the gap between said frame and form, and overlying the latter.

22. In a loom for weaving curved fabrics, the combination with means for supporting warp threads, and mechanism for laying weft threads transversely across the same, of a segmental annular pivoted form in position to receive the fabric as it is woven, and a thin, fixed, curved shield bridging the gap between the weaving mechanism and said form, and overlying the latter.

23. In a loom for weaving curved fabrics, the combination with a curved frame around which the fabric is woven, of a fixed shield attached to and conforming to the shape of said frame, and also curved longitudinally, said shield serving to support the woven fabric as it comes from said frame.

24. In a loom for weaving curved fabrics, the combination with a frame around which the fabric is woven, of an arc-shaped fixed support having one end in position to receive the fabric as it comes from such frame, and means for gradually feeding the fabric circumferentially along such arc-shaped support.

25. In a loom for weaving curved fabrics, the combination with a die, of means for drawing warp threads through the same, under tension, means for forming a curved shed in said threads, a curved needle disposed adjacent said die, and means for oscillating said needle so as to cause it to enter such shed and lay weft threads therein.

26. In a loom for weaving curved fabrics, the combination with a die plate having an opening, of means for drawing warp threads through the same, a heddle for said threads, and a curved oscillatory needle for laying weft thread transversely of said warp threads, said needle being disposed between said heddle and die plate, and in a plane substantially parallel with the latter.

27. In a loom for weaving circular fabrics, the combination with means for supporting warp threads so as to conform to the arc of a circle, of a rigid annular needle, means for forming a heddle comprising a plurality of rods disposed around the axis of said needle, and having thread receiving eyes, means for shifting said rods in two groups to form a complete cylindrical shed in said warp threads, and means for moving said needle about its axis so as to cause it to lay weft thread throughout said shed.

28. In a machine for forming curved fabrics, the combination of a fixed structure, curved both transversely and longitudinally, throughout its length, around one curved end of which the threads making up the fabric are laid, means for so laying and uniting such threads as to form the fabric, and means for feeding the finished fabric along such curved structure as the fabric is formed.

29. In a machine for producing curved fabrics, the combination with a fixed elongated supporting structure curved transversely and arc-shaped longitudinally, of means for positioning warp threads therearound, a curved needle disposed adjacent one end of said arc-shaped structure and lying in a plane transverse to said structure and passing through the center of the arc thereof, and means for moving said needle so as to cause it to lay weft threads across said warp and around said structure to form the fabric.

30. In a machine for producing curved fabrics, the combination with a fixed elongated supporting structure curved transversely and arc-shaped longitudinally, of means for positioning warp threads therearound, a curved needle disposed adjacent one end of said arc-shaped structure and lying in a plane transverse to said structure and passing through the center of the arc thereof, means for moving said needle so as to cause it to lay weft threads across said warp to form the fabric, and means for feeding such fabric along said structure as it is formed.

31. In a loom of the class described, a rigid annular weft needle having circumferential thread guiding means, and a delivery eye.

32. In a loom of the class described, a rigid annular weft needle having a gap, and a thread delivery eye adjacent said gap.

33. In a loom of the class described, a weft needle comprising a hub, a radially extending supporting arm, and a rigid annular body carried by said arm.

34. In a loom of the class described, a weft needle comprising a hub, a radially extending supporting arm, and a rigid annular body carried by said arm and having a gap adjacent thereto.

35. In a loom of the class described, a weft needle comprising a hub, a radially extending supporting arm, and a rigid annular body carried by said arm, said body having a gap adjacent said arm, thus forming a free end, said end having a thread delivery eye.

In testimony whereof I affix my signature.

EMANUEL INGHAM.

Feb. 13, 1923.

Re. 15,537

J. A. WHERRY

TYPEWRITER

Original Filed Nov. 4, 1919 5 sheets-sheet 1

Inventor

John A Wherry by B B Stickney

Attorney